3,513,122
PRINTING ON LUBRICATED SURFACES AND INK COMPOSITION USEFUL THEREIN
John E. Dereich, Pittsburgh, Pa., assignor to Neville Chemical Company, Pittsburgh, Pa., a corporation of Pennsylvania
No Drawing. Filed Feb. 20, 1967, Ser. No. 617,035
Int. Cl. C08g *51/30;* C08c *1/24*
U.S. Cl. 260—33.8                                   7 Claims

ABSTRACT OF THE DISCLOSURE

One-part, self-curing, low melting, two-stage, solid epoxy resin ink compositions which contain a chlorinated aromatic hydrocarbon as a modifier are used in forming prints, labels, design or coatings on solid objects such as glass bottles or similar articles even when they have a film of lubricant applied to their surface. When these organic ink compositions are applied in molten form to the lubricated surface, they absorb or dissipate the lubricant and dry almost instantly to a tenacious, non-tacky surface, permitting the subsequent printing of a differently colored ink design thereover. In the absence of the chlorinated aromatic hydrocarbon additive, previously used printing compositions did not adhere well to the lubricated surface and tended to lift off during subsequent printing or other manipulative steps prior to being finally cured.

In a preferred embodiment these epoxy resin ink compositions include a curing system which comprises a guanidine compound such as dicyandiamide which is promoted with a small amount of a metal salt of a $C_6$ to $C_{18}$ monocarboxylic acid, and particularly a zinc soap, to increase the alkali resistance of the cured print.

Cross-references

Earlier developments in this art are disclosed in applicant's copending applications Ser. No. 401,724, filed Oct. 5, 1964 and Ser. No. 525,117, filed Feb. 4, 1966.

State of the art

It is common practice to coat glass bottles with a thin, essentially transparent layer of a lubricating composition such as calcium stearate, tin stearate or other metal soap of a higher fatty acid or with dry solid lubricant film of other known protective lubricant such at tetraisopropyl titanate in order to prevent abrasive damage to the bottles as a result of their rubbing against each other in automatic filling machines, etc. Such lubricants are usually applied to the bottles in the form of dilute solutions in a volatile solvent which are sprayed on and from which the solvent thereafter evaporates. While this is effective in reducing damage to the bottles, the coating tends to interfere with the proper wetting of the glass and the formation of an adhesive bond between the glass substrate and an ink film printed thereover, Particularly when a multi-print operation is required, such as in printing a dual-colored label, the poor adhesion of the first print will cause it to become distorted or come off on the next printing screen. This is especially true when the multi-printing operation is carried out at high speeds.

Even when the printing operation can be satisfactorily performed on the lubricated surface and the resulting print is fully cured, insufficient wetting of the glass substrate with the printing composition and the consequently reduced adhesion of the printed matter to the glass can result in the entire printed matter or film becoming detached from the glass in subsequent washing or scrubbing operations.

Summary of invention

The present invention provides a thermosetting coating composition which, because of the inclusion of a chlorinated aromatic hydrocarbon, has the ability to dissipate or absorb the lubricant commonly applied to glass bottles and adhesively bond itself to the surface of the glass even before being subjected to a curing operation. As a result the novel composition can be used equally well on lubricated surfaces as on unlubricated surfaces. In a preferred embodiment, it provides a process permitting high speed printing of multicolor labels on glass which has been coated with a lubricating composition by employing a curable, organic base ink composition which can dissipate or counteract the anti-adhesive effect of the underlying lubricating composition.

In its preferred forms this invention provides a two-stage (first thermoplastic and then thermosetting), non-sagging, curable coating or ink composition which is a tack-free solid at room temperature; which melts and acts as a liquid at an application temperature between about 120° and 300° F., (preferably between 120° and 180° F.) and has a long pot life at such temperature; penetrates or wets through the underlying lubricating composition on glass coated therewith; which rapidly forms a solid, tenacious, non-smudging film or label when imprinted on a cool solid substrate; and which can be cured either by itself or after application of a contrasting overprint to form a hard, adherent, heat and solvent resistant film. The curing operation comprises heating the imprinted glass substrate for about 4 to 20 minutes at a temperature between 400° F. and 500° F. At lower temperatures a longer curing time is of course required than at higher temperatures. For the purpose of this invention, "long pot life" means that the coating composition can be kept in the liquid state at the application temperature for at least 8 hours without substantial change in color, viscosity, etc. The viscosity at application temperature should be between about 3,000 and 100,000, preferably between about 5,000 and 50,000 cps. The optimum viscosity depends somewhat on the characteristics of the printing equipment, such as screen mesh, used.

The present organic base printing composition can be supplied in the form of a low-melting, dry solid which can be metered to the printing stage from heated containers as required. To make such a material, the several organic ingredients are melted and mixed together at a temperature will below the activation temperature of the mix, which is then allowed to cool. The resulting uniform solid mixture is then milled with the desired pre-sized or pre-ground pigment on a heated three-roll mill or similar device to disperse the pigment uniformly. In any event, any infusible components such as pigments must be ground fine enough to pass through the particular screen mesh size used.

The compositions of this invention produce a base print on lubricated glass which even before curing has a dry, tenacious surface. This permits the freshly labeled bottles to be moved around in the equipment and further processed, such as by screening a second color print over the uncured base print, with little risk of removing or marring the print. When the ink compositions include a guanidine compound promoted with a metal salt such as zinc neo-decanoate as the curing system prints having particularly good resistance to alkali are obtained.

Further description of the invention

According to the present invention, printing compositions having the desired characteristics can be formulated by mixing the following:

(a) About 100 parts of an epoxy resin or a mixture of different epoxy resins having an epoxide equivalent between about 140 and 4,000, preferably between about 170 and 2,500, and most preferably between about 170 and 600, and a softening or melting point between about 150° and 170° F., e.g., Shell "Epon 1001," Ciba "6071," Dow "660," and similar epoxy resins;

(b) About 10 to 45 parts and preferably 20 to 35 parts of a chlorinated polynuclear aromatic hydrocarbon of from 10 to 18 carbon atoms and a chlorine content of about 40 to 70%. Chlorinated biphenyls are particularly preferred, e.g., Monsanto "Arochlor 1254" which is a chlorinated biphenyl containing about 55% chlorine. Other useable additives of this kind include chlorinated triphenyls, chlorinated naphthalenes, chlorinated anthracenes and mixtures of the foregoing. The optimum concentration of a particular chlorinated compound in the epoxy base depends on the screening temperature required and is readily determined by empirical tests. The viscosity of the ink at the selected screening should be high enough to avoid spontaneous passage through the screen and yet low enough to permit high speed printing;

(c) An effective amount, such as 5 to 12 parts, preferably 6 to 8 parts, of a curing agent or hardener capable of effecting the required crosslinking of the epoxy resin at a temperature between about 350° and 500° F. The preferred curing agent is cyanoguanidine, more often referred to as dicyandiamide ("dicy"), which has outstanding package stability in contact with reactive epoxy resins and gives excellent pot life at temperatures up to 300° F. However, workable compositons can also be formulated using other known curing agents of the guanidine class. The preferred guanidine compounds, such as dicy, tetramethylguanidine, etc. can be represented by the formula

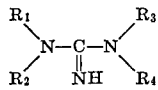

wherein $R_1$, $R_2$, $R_3$ and $R_4$ are the same or different and are selected from the group consisting of hydrogen, cyano, $C_1$ to $C_3$ alkyl groups and $C_1$ to $C_3$ hydroxyalkyl groups. The corresponding bis-compounds, such as biguanide ($NH_2$—CNH—NH—CNH—$NH_2$) and heptamethylisobisguanide are also useable. Furthermore, solid anhydrides of polycarboxylic acids which are well known curing agents for epoxy resins and which do not unduly raise or reduce the melting point of the composition, such as hexahydrophthalic anhydride, are also usable. However, the anhydrides have the disadvantage of limited pot life, being required in greater concentrations, and also of being more moisture sensitive and often costlier than the guanidine compounds.

When especially low screening temperatures are desired, auxiliary viscosity modifiers in the amount of up to 25 parts, preferably about 10 to 18 parts, may also be added to the blend to lower its viscosity. These modifiers must be soluble in the epoxy resin formulation, have a sharp melting point between about 100° and 150° F., preferably between 105° and 120° F. (to enhance freedom from tack on the bottle immediately after screening), and must not impair the final cure of the composition. When using dicy as the curing agent, phenyl salicylate (salol) is outstanding because it assures complete and uniform solution of dicy in the epoxy resin formulation. Otherwise, dicy is insoluble in the common materials used in epoxy formulations at temperatures below 300° F. and therefore tends to settle out from the melt in the supply tank unless agitated. Benzophenone is another good viscosity modifier for use with dicy-containing compositions, though not as effective as phenyl salicylate.

Another usable viscosity modifier is triphenyl phosphate, but it is more useful in formulations employing an acid anhydride curing agent. When used in a formulation employing a basic type curing agent such as dicy, the ability of the formulation to cure tends to diminish with time.

In a particularly preferred embodiment of this invention the curing agent or hardener also contains a metal salt of a monocarboxylic acid of from 6 to 18 carbon atoms as a cure promoter. This metal salt can be used in an amount of from about 0.2 to 1.2% (preferably 0.3 to 0.8%) by weight, based on the amount of epoxy resin. Illustrative of the metals which react with the monocarboxylic acids to form such salts are cadmium, calcium, lithium, magnesium, tin and zinc. Illustrative of the acids reacted to produce the salts are naphthenic acids ($C_6$), octanoic acid ($C_8$), neo-decanoic acid ($C_{10}$), tall oil (oleic-linoleic acid mixtures), etc. The zinc salts generally, and zinc soaps of branched aliphatic "neo"-acids such as neo-decanoic acid specifically, are preferred because of their compatibility with the base system and the absence of any adverse color effect on curing. The zinc neo-decanoate may be represented by the formula

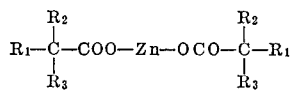

where $R_1$ is a branched chain alkyl group of 3 to 6 carbon atoms and $R_2$ and $R_3$ are methyl or other lower alkyl radicals such that the sum of carbon atoms in $R_1$, $R_2$ and $R_3$ is eight. The addition of such salts has the effect of improving the cure of the thermosetting resin to the point where the cured label will not be affected by alkali washings to which beverage bottles are normally subjected.

In addition to the resin-forming solid organic ingredients, the composition will, of course, contain varying amounts, e.g., 0.5 to 60%, but preferably not more than about 40% (based on total weight of the composition), of the conventional non-reactive, normally solid, organic or inorganic ink ingredients such as pigments or dyes, ultraviolet screening compounds, etc. Particularly useful pigments are titanium dioxide, copper phthalocyanine (Monastral blue), iron oxide reds, chrome green, chrome yellow, suitably tinted glass frit, monoazo dye-stuffs such as Victoria maroon, etc.

The optimum proportions of the several ingredients described above may vary somewhat within the ranges suggested above depending on the specific ingredients used and process conditions to be met, as well as on the final film properties desired, and are readily determined by preliminary empirical testing.

In addition to the principal ingredients described above, appropriate auxiliary amounts of still other materials or additives of the type known to be useful in epoxy coating compositions may also be included. One such material is Dow Corning No. 200 silicone fluid which is useful as a wetting agent. For instance, small amounts, usually less than 5%, of known thixotropic gellants or flow control agents also can be added to minimize sagging of the uncured print. Such gellants may be compounds of bentonite or hydrous silicate montmorillonite with an organic base, e.g., dimethyldioctadecyl ammonium bentonite or similar tetraalkyl ammonium compounds, or fine particle size silica (Cabosil), etc.

If a particularly hard surface or if enhanced sheen is desired upon curing, the base composition may also include a hard synthetic wax that is compatible with the formulation used, e.g., a polyamide wax. "Rosswax 141," which has a melt point of 141° C. and is made by the Frank B. Ross Co., Jersey City, N.J. is an example of a suitable commercial polyamide wax. Up to 2 to 5 parts of such a wax can be used per 100 parts of epoxy resin.

In printing the multicolored label which is of primary interest to this invention, a top coat of a different color is printed over the base coat described earlier herein. In such a case it is preferable that the ink composition used in forming the overprint have a substantially lower melting point than the base coat, so as to permit applying the top coat in liquid or molten form at a temperature at least about 15° F. lower than the melting point of the base coat. Moreover, the top coat should be curable simultaneously with the base coat, to avoid the necessity for a double cure. For this reason, the resin system used in formulating the top coat should be chemically compatible with the base coat; it should preferably contain the same kind of reactive materials, e.g., epoxy resin, as the base coat. However, the aromatic chlorinated hydrocarbon additive need not be present in the overprint composition. While it is preferred to use a base coat which gives a dry, solid film promptly after application and cooling, a good quality overprint can be made from compositions which produce a coat that is tacky or liquid at room temperature before curing. Accordingly, the overprint composition may be a relatively low melting solid, liquid or even a thixotropic gel, at room temperature. The desired low melting point can be obtained in a variety of ways. For instance, one can use a relatively low melting epoxy resin, or a mixture of a high melting and a low melting or liquid epoxy resin. In addition, one may also increase the concentration of the low melting viscosity modifier if such is used in the mixture.

In making the ink compositions of the present invention, the selected ingredients may be mixed on a conventional paint mill or ground in a chilled ball mill. It is preferred to blend the epoxy resin or resins with the chlorinated aromatic hydrocarbons by heating and mixing these ingredients together at a temperature sufficient to form a fluid melt, e.g., about 180° to 200° F., and allowing the resulting blend to cool to about 150° to 170° F. before adding and mixing in the curing agent, gelling agent and other materials.

The epoxy resins useful in the present invention are well known commercial products obtained by condensing a polyhydric phenol such as 2,2-bis(p-hydroxyphenyl) propane with an excess of a 1,2-epoxy-3-halohydrin such as epichlorohydrin so as to provide a solid resin having a softening point in the aforementioned temperature range. Other polyhydric phenols or bisphenols useful in the preparation of suitable epoxy resins include bis(p-hydroxyphenyl) methane as well as trihydric phenols such as 3,4-di(p-hydroxybenzyl) phenol. The resins which may be used in this invention have a 1,2-epoxy equivalency greater than 1.0, i.e., the average number of 1,2-epoxy groups contained in the average molecule of the resinous reaction product is greater than 1, or, put differently, the resin contains an epoxide equivalent in the range between about 140 and 2,500, preferably between about 170 and 600. By "the epoxide equivalent," reference is made to the grams of the polymeric resin containing 1 gram equivalent of epoxide. An excess of epichlorohydrin is generally used in producing the normally solid resins. The epoxy resins themselves, as well as various methods for their preparation are well known and are described, for instance, in U.S. Pat. Nos. 2,765,288; 2,965,610 and 3,062,771 among many others.

Epoxy resins which are suitable for formulating the overprint may vary over a wide range. These may include, for instance, liquid epoxies such as Shell "Epon 828" (a bisphenol-A epichlorohydrin reaction product having an epoxide equivalent 175–200; viscosity 10,000–16,000 cps. at 25° C.) and epoxy novolacs, that is, epoxy resins obtained by reacting epichlorohydrin with a phenol-formaldehyde novolac. Representative of such epoxy novolacs are Dow "D.E.N. 438" (epoxide equivalent 170–185; viscosity 35,000–70,000 cps. at 25° C.), Ciba "E.P.N. 1138," Shell "Epon 154," etc.

"Epon 1001," made by Shell Chemical Co., is a commercially available resin of the epichlorohydrin bisphenol-A type which is typical of the solid resins which are well suited for use in the base coat herein. This epoxy resin has the properties summarized in Table I.

TABLE I

Specifications for typical solid epoxy resin

Melting point [1]—150°–165° F.
Color, 77° F. (Gardner) [2]—4 max.
Viscosity [3], 77° F.—1.0–1.7 poise (D–6X Gardner-Holt).
Epoxide equivalent [4]—475–525.
Avg. molecular weight—900.
Equivalent weight (g. resin to equiv. OH/100 g. resin)— 0.28.
Bulk density of flaked material—35–40 lb./cu. ft.
Weight per gallon 68° F. (void-free)—9.9 lb.

[1] Durrans' Mercury Method, SMS 114.
[2] ASTM D 1544–585; 40% solution in butyl Carbitol.
[3] Bubble-Tube Method (ASTM D–154); solution in butyl Carbitol.
[4] Grams of resin containing one gram equivalent of epoxide.

Commercial epoxy resins substantially equivalent to "Epon 1001" and well suited in formulating the base coat compositions herein are Resin "520/520C" made by the Jones Dabney Company, "D.E.R. 660" made by Dow Chemical Company, "Ciba 6071" made by Ciba Chemical Company, and many others.

The printing process of the present invention can be carried out on equipment now used in printing labels or decorative designs on glass by the conventional glass frit process. For instance, in carrying out the novel process the novel resinous labeling composition, after being heated to a temperature above its melting point, may be applied to glass by screening through a heated stencil. In such a process the desired pattern, label or design is cut in a cloth-like stainless steel mesh screen which is backed with an impervious plastic film, and the molten labeling composition is then squeegeed through the unbacked section of such a screen directly onto a glass bottle or other object which is brought in contact with the screen. The metal screen, being an electrical resistor, can be conveniently maintained at the desired temperature, e.g., between about 110° and 220° F., by passing electric current of appropriate intensity through it. At the point of use, on the screen, the labeling composition desirably has a viscosity of about 1,000 to 40,000 cps., i.e., it has a consistency such that it does not readily pass through the design cut in the screen except when it is positively forced through it by means of a squeegee or flexible wiper blade passing over the screen. The labeling composition itself may be supplied to the screen in hot liquid form from an adjacent reservoir which is maintained at an appropriate temperature.

When employing an ink formulated in accordance with this invention, the resulting print absorbs or dissipates the lubricant previously applied to the glass surface and solidifies almost instantly, that is, usually in less than one second after application to the bottle which is substantially at room temperature (60°–90° F.). Consequently, as soon as the glass bottle is imprinted and rolls away or is withdrawn from the printing stage it is substantially dry to the touch and can be passed to the next stage, e.g., to receive a contrasting coat of ink in a subsequent printing stage without removal of the base print and then be cured in a baking oven. Bottles imprinted with the base coat of this invention can be held in storage for later processing, or otherwise handled in the uncured state without risk of smearing.

With proper equipment it is possible to print more than 100 or even 200 bottles per minute.

The printed bottles are finally passed to a baking oven where they are heated at a temperature between about 350° and about 500° F. for about 4 to about 20 minutes, preferably for from 5 to not more than 10 minutes, cooled in air and are then immediately ready for use. However, curing time depends on the heat capacity of the oven, and the weight and number of bottles exposed to the heating area. Excellent high gloss labels resistant to immersion in water, dilute alkali solutions, detergent solutions and organic solvents such as acetone are thus produced in a very effective and economical way.

The invention is further illustrated by the following specific examples. Unless otherwise indicated, all amounts and proportions of materials are expressed on a weight basis throughout this specification.

Example I

A solid base coat ink composition was formulated according to the following: 70 parts of "Epon 1001" epoxy resin were blended with 30 parts of "Arochlor 1254" chlorinated biphenyl (55% chlorine) at a temperature of 190° F. After thorough blending, the mass was cooled to 170° F. while agitating and the following added:

|  | Parts |
|---|---|
| Dicyandiamide | 5 |
| Bentonite-organic base gellant [1] | 1.5 |
| Dow Corning No. 200 fluid (silicone) | 0.3 |
| Titanium dioxide pigment | 35.0 |

[1] Dimethyl dioctadecyl ammonium bentonite.

This ink composition was used to print the usual type of labels on glass bottles coated with a film of tin stearate lubricant. An electrically heated, 180 mesh stainless steel screen was used as the stencil and maintained at a temperature of 165° F. A sharply defined print was produced which was tack free at room temperature.

This base print was overprinted at a temperature of 110° F. with a liquid ink containing iron oxide as the pigment at speeds of about 100 bottles per minute. The base print remained firmly adhered to the glass substrate before, during and after this overprint operation. The overprint has the following composition:

|  | Parts |
|---|---|
| "Epon 828" liquid epoxy resin [1] | 80 |
| 1,6-hexanediol | 20 |
| Dicy | 5 |
| High temperature gellant ("Bentone 27") | 3 |
| Iron oxide pigment | 30 |

[1] Epoxide equivalent 180–195. Gardner viscosity 150 poises at 25° C.

The alkane diol, when added in a proportion of between about 10 to 40 parts per 100 parts of epoxy resin, serves as a gelling agent for the liquid epoxy at low temperature, keeping the normally liquid epoxy resin from running down the side of the bottle at room temperature. The high temperature gellant further helps to keep the ink from running during the curing cycle without unduly increasing the ink viscosity in the printing stage.

The coated glass substrate was then heated in a curing oven at a temperature of about 425° F. for a period of about 10 minutes. Both the base coat and the overprint gave a hard glossy surface upon curing, and the product had excellent resistance to caustic wash solutions.

By contrast, when the same base formulation is tried without the chlorinated biphenyl the absence of its plasticizing action results in a composition having a too high melt point and viscosity such that it will not pass through the screen. When an attempt is made to remedy this by use of lower melting epoxy resin or by use of other plasticizers such as cetyl alcohol, it is found that the formulation either fails to wet through and penetrate the lubricant film or for other reasons will not show the tenacious adhesion to the glass surface after curing as will satisfactorily resist the 5% caustic wash solution.

Example II

This example shows the alkali resistance of a composition including the zinc salt of neo-decanoic acid,

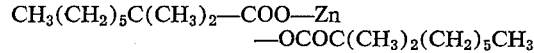

The composition was prepared as follows: 70 parts of "Epon 1001" epoxy resin were blended with 30 parts of "Arochlor 1254" chlorinated biphenyl at a temperature of 190° F. After thorough blending the mass was cooled to 170° F. while agitating and the following was added:

|  | Parts |
|---|---|
| Dicyandiamide | 5 |
| Bentonite-organic base gellant [1] | 1.5 |
| Dow Corning No. 200 fluid (silicone) | 0.3 |
| Zinc salt of neo-decanoic acid | 0.3 |

[1] Dimethyl dioctadecyl ammonium bentonite.

The ink composition was used to print the usual type of labels on one set of glass bottles and compared with a set of control bottles printed with labels whose composition was essentially the same but did not contain the zinc salt. The same curing cycle as described in Example I was used to cure both sets.

The bottles were immersed in a 5% NaOH solution at 170° F. for 10 minutes, washed with water and dried. Scotch tape was pressed over the printed areas of the bottles and quickly ripped off. Parts of the label which did not contain the zinc salt were thereby removed. The labels which did contain the zinc salt remained firmly adhered to the glass substrate. This is unexpected and significant in that the usual paint driers are not recommended for use in dicyandiamide type epoxy curing systems. Washing cycles in the beverage bottling plants are frequently not closely controlled and are often quite drastic, especially when a batch is allowed to remain in the washer overnight. Soaps of other metals such as cobalt or tin may be used similarly but tend to discolor the label upon curing. Of course, in applications where the bottles are not intended for beverages and therefore are not required to be washed in alkali, the metal soap cure accelerator may be omitted. Conversely, the inclusion of the metal soap cure accelerator improves the alkali resistance of prints formed from epoxy resin inks even when the latter do not contain a chlorinated aromatic hydrocarbon.

The invention described in the foregoing specification is particularly pointed out in the appended claims.

I claim:
1. A one-part, self-curing resinous ink composition having a melting point between about 120° and 300° F. and having the ability to form a tenacious adhesive bond with a substrate, which composition comprises:
   (a) 100 parts of normally solid, fusible epoxy resin which melts at a temperature between about 125° and 200° F. and which has an epoxide equivalent of between about 140 and 4,000;
   (b) 10 to 45 parts of a chlorinated polynuclear aromatic hydrocarbon of from 10 to 18 carbon atoms and containing 40 to 70% chlorine;
   (c) an effective amount of a hardener adapted to cause crosslinking of said epoxy resin upon heating; and
   (d) an effective amount of pigment.

2. A resin composition as defined in claim 1 containing from about 5 to 12 parts of a guanidine compound as the hardener for said epoxy resin.

3. A resin composition as defined in claim 2 wherein the chlorinated aromatic compound comprises a chlorinated biphenyl containing 50 to 60% chlorine.

4. A resin composition as defined in claim 3 wherein the hardener comprises 5 to 12 parts of dicyandiamide per 100 parts of epoxy resin and from about 0.2 to about 1.2 parts of a metal salt of a monocarboxylic acid of from 6 to 18 carbon atoms as a cure promoter.

5. A resin composition as defined in claim 4 wherein the metal salt is the zinc salt of neo-decanoic acid.

6. A resin composition as defined in claim 1 which also contains about 10 to 18 parts of an auxiliary viscosity modifier selected from the group consisting of phenyl salicylate, benzophenone and triphenyl phosphate.

7. A resin composition as defined in claim 4 which further comprises about 10 to 18 parts phenyl salicylate.

References Cited

UNITED STATES PATENTS

| | | | |
|---|---|---|---|
| 3,373,131 | 3/1968 | Bolstad et al. | 117—38 |
| 3,386,848 | 6/1968 | Dereich | 117—38 |
| 3,413,256 | 11/1968 | Bolstad et al. | 117—38 |
| 3,378,509 | 4/1968 | Jerabek. | |

MORRIS LIEBMAN, Primary Examiner

L. T. JACOBS, Assistant Examiner

U.S. Cl. X.R.

260—37